J. B. Christoffel,
Gage Cock.

No. 100,981. Patented Mar. 22, 1870.

Witnesses:
A. W. Almqvist
Edgar Tate

Inventor:
J. B. Christoffel
Per Munn & Co
Attorneys.

United States Patent Office.

JOHN B. CHRISTOFFEL, OF WILLIAMSBURG, NEW YORK.

Letters Patent No. 100,981, dated March 22, 1870.

IMPROVEMENT IN GAUGE-COCKS.

The Schedule referred to in these Letters Patent and making part of the same.

*To all whom it may concern:*

Be it known that I, JOHN B. CHRISTOFFEL, of Williamsburg, in the county of Kings and State of New York, have invented a new and useful Improvement in Gauge and Stop-Cocks; and I do hereby declare that the following is a full, clear, and exact description thereof, which will enable others skilled in the art to make and use the same, reference being had to the accompanying drawings forming part of this specification, in which—

My invention has for its object to furnish an improved cock, designed for use as a gauge-cock for steam-boilers and for a stop-cock for reservoirs, in which water, oil, or any volatile liquid is contained, and which shall be so constructed as to allow the valve or piston to be repacked without removing the cock or allowing any of the steam or liquid to escape; and It consists in the cock constructed as hereinafter more fully described.

A represents the barrel of the cock, the inner end of which is connected with the boiler or reservoir in the ordinary manner.

Figure 1:
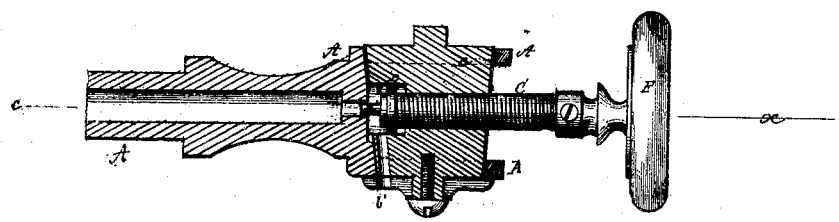
Figure 1 is a longitudinal section of my improved device, taken through the line $y\ y$, fig. 1, when arranged for use as a cock.
Figure 2:
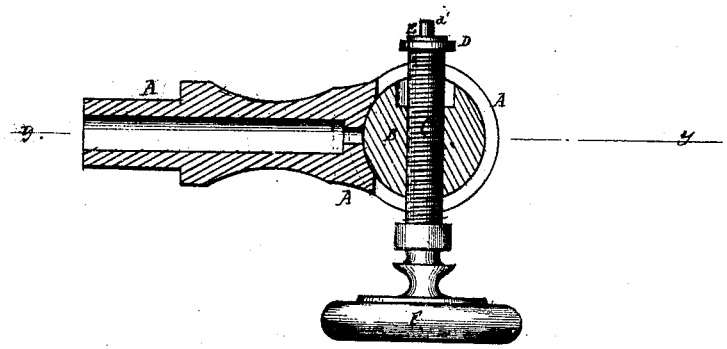
Figure 2 is a longitudinal section of the same taken through the line $x\ x$, fig. 1, when arranged for repacking the valve or piston.
Figure 3:
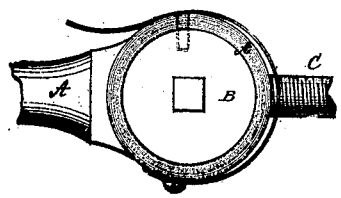
Figure 3 is a detail top view of the same.
Figure 4:
Figure 4 is a detail sectional view of the piston.

The outer end of the barrel A is enlarged, and is slotted horizontally, as shown in fig. 1, the flanges thus formed being perforated, as shown in figs. 1, 2, and 3, to receive the conical plug B.

The end of the solid or central part of the said outer end of the barrel A is concaved to fit closely upon the side of the plug B.

The plug B is drawn down into and held in its seat by means of a screw and washer, as shown in fig. 1.

The upper end of the plug B may have a square projection formed upon it to receive a wrench, for convenience in turning it, when required.

The plug B is perforated through its middle part, as shown in figs. 1 and 2, said perforation being upon a line with the cavity of the barrel A, and having a screw-thread cut in its inner surface to receive the screw-stem C of the valve or piston D.

The side of the plug B next the end of the barrel A is chambered out, as shown in figs 1 and 2, to receive the piston D, and allow it to be moved forward and back to close and open the discharge-opening in the end of the barrel A.

The piston D may be formed solid upon the end of the stem C, or may be formed separate and connected with it by a pin, or in any other convenient manner.

The face of the piston has a dovetailed cavity formed in it to receive the rubber, leather, or other suitable packing E.

The face of the piston D has a short pin, $d'$, formed in its center, which enters and fits into the discharge-orifice of the barrel A, said discharge-orifice or opening being made small for a distance equal to the length of the pin $d'$, so that when the piston D is forced forward to its seat, the pin $d'$ may push back any sediment or other obstruction from the discharge-orifice into the enlarged part of the cavity of the barrel A.

The piston D is moved forward to close the discharge-orifice of the barrel A, and back to open said orifice by turning the screw-stem C.

To the outer end of the screw-stem C is detachably attached a knob or other handle, F, for convenience in turning it.

From the piston-chamber of the plug B a passage or channel, B', is formed, leading down through the solid body of the said plug and through the lower flange of the barrel A, as shown in fig. 1, for the escape of the steam, water, oil, or other substance for drawing which the cock is used.

Should the valve leak, and it become necessary to renew the packing E, the stem C is operated to draw the piston D into the chamber of the plug B, which plug is then turned one-quarter around.

This allows the piston to be conveniently repacked, the solid side of the plug B in the mean time closely closing the discharge-opening of the barrel A, as shown in fig. 2.

The form of the parts may be varried according to the particular use to which the cock is to be applied.

The plug B may be secured in place, when adjusted by the pin G attached to the spring H, which passes around the edge of the flange of the barrel A, to which flange the other end of the said spring is securely attached.

Having thus described my invention,

I claim as new and desire to secure by Letters Patent—

The combination of the barrel A, perforated and chambered conical plug B, screw-stem C, and piston D $d'$ with each other, substantially as herein shown and described, and for the purpose set forth.

The above specification of my invention signed by me this 19th day of January, 1870.

JOHN B. CHRISTOFFEL.

Witnesses:
GEO. W. MABEE,
JAMES T. GRAHAM.